(12) United States Patent
Ogata et al.

(10) Patent No.: US 9,512,883 B2
(45) Date of Patent: Dec. 6, 2016

(54) METHOD FOR MANUFACTURING A WHEEL BEARING APPARATUS

(71) Applicant: NTN Corporation, Osaka-shi (JP)

(72) Inventors: Yuuki Ogata, Iwata (JP); Tomoaki Sawada, Iwata (JP); Masami Ishiyama, Iwata (JP); Shinya Okada, Iwata (JP)

(73) Assignee: NTN Corporation, Osaka-shi (JP)

( * ) Notice: Subject to any disclaimer, the term of this patent is extended or adjusted under 35 U.S.C. 154(b) by 346 days.

(21) Appl. No.: 14/105,621

(22) Filed: Dec. 13, 2013

(65) Prior Publication Data

US 2014/0096394 A1 Apr. 10, 2014

Related U.S. Application Data

(63) Continuation of application No. PCT/JP2012/065087, filed on Jun. 13, 2012.

(30) Foreign Application Priority Data

Jun. 14, 2011 (JP) .................... 2011-132086

(51) Int. Cl.
*F16C 43/04* (2006.01)
*B60B 27/00* (2006.01)
*F16C 19/18* (2006.01)

(52) U.S. Cl.
CPC ........... *F16C 43/04* (2013.01); *B60B 27/0005* (2013.01); *B60B 27/0094* (2013.01); *F16C 19/186* (2013.01); *B60B 2380/772* (2013.01); *B60B 2900/325* (2013.01); *F16C 2229/00* (2013.01); *F16C 2326/02* (2013.01); *Y10T 29/49679* (2015.01)

(58) Field of Classification Search
CPC .......... B60B 27/0005; B60B 27/0068; B60B 27/0084; B60B 27/0078; B60B 27/0094; B60B 2380/73; B60B 2380/772; B60B 2900/325; F16C 43/04; F16C 19/186; F16C 2229/00; F16C 2326/02; Y10T 29/49679; Y10T 29/497; Y10T 29/49696; Y10T 29/4968; Y10T 29/49776
See application file for complete search history.

(56) References Cited

U.S. PATENT DOCUMENTS

| | | | |
|---|---|---|---|
| 6,491,440 B1 * | 12/2002 | Sahashi et al. | 384/544 |
| 6,497,515 B1 * | 12/2002 | Sahashi et al. | 384/544 |
| 2002/0051597 A1 * | 5/2002 | Sera et al. | 384/544 |
| 2006/0120650 A1 * | 6/2006 | Niebling et al. | 384/544 |
| 2006/0165332 A1 * | 7/2006 | Terada et al. | 384/544 |
| 2007/0047863 A1 * | 3/2007 | Yasumura et al. | 384/544 |
| 2008/0199121 A1 * | 8/2008 | Komori et al. | 384/490 |
| 2008/0205811 A1 * | 8/2008 | Komori et al. | 384/544 |

(Continued)

FOREIGN PATENT DOCUMENTS

| | | |
|---|---|---|
| JP | 58-121322 | 7/1983 |
| JP | 09-196605 | 7/1997 |

(Continued)

*Primary Examiner* — John C Hong
(74) *Attorney, Agent, or Firm* — Harness, Dickey & Pierce, P.L.C.

(57) ABSTRACT

A method for manufacturing a wheel bearing apparatus by measuring a distance Ho, Hi and Hh. A difference $\Delta H=(Hi+Hh-Ho)$ is compared with a reference value of a model article. Rolling elements are selected with each having an optimum diameter to correct the difference $\Delta H$ between the measured values and the reference values.

8 Claims, 5 Drawing Sheets

(56) References Cited

U.S. PATENT DOCUMENTS

| | | | |
|---|---|---|---|
| 2008/0226213 A1* | 9/2008 | Niebling et al. | 384/512 |
| 2008/0240635 A1* | 10/2008 | Niebling et al. | 384/416 |
| 2009/0046975 A1* | 2/2009 | Kawamura et al. | 384/613 |
| 2009/0154864 A1* | 6/2009 | Komori et al. | 384/589 |
| 2009/0220180 A1* | 9/2009 | Ohtsuki et al. | 384/512 |
| 2009/0232435 A1* | 9/2009 | Ohtsuki | 384/544 |
| 2009/0251133 A1* | 10/2009 | Fukada et al. | 324/174 |
| 2009/0274404 A1* | 11/2009 | Torii et al. | 384/448 |
| 2010/0220950 A1 | 9/2010 | Miura et al. | |
| 2011/0077089 A1* | 3/2011 | Hirai et al. | 464/139 |
| 2011/0243487 A1* | 10/2011 | Sutherlin et al. | 384/464 |

FOREIGN PATENT DOCUMENTS

| | | |
|---|---|---|
| JP | 11-044319 | 2/1999 |
| JP | 2005-325902 | 11/2005 |
| JP | 2006-285892 | 10/2006 |
| JP | 2007-216947 | 8/2007 |
| JP | 2008-089131 | 4/2008 |
| JP | 2008-106904 | 5/2008 |

* cited by examiner

[Fig 1]
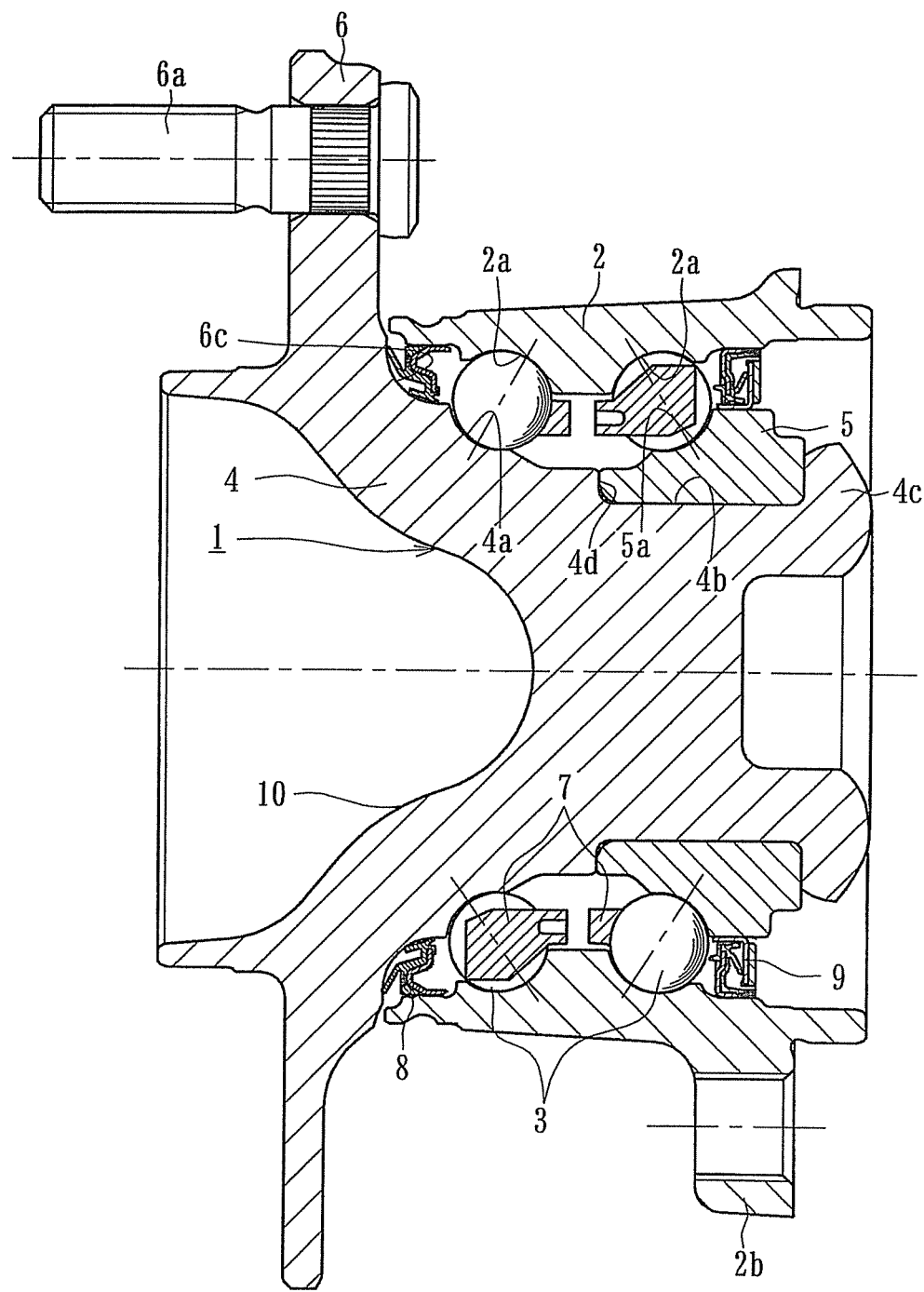

[Fig 2]
(a)
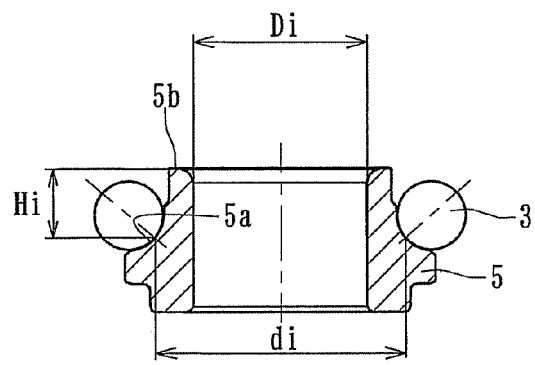
(b)
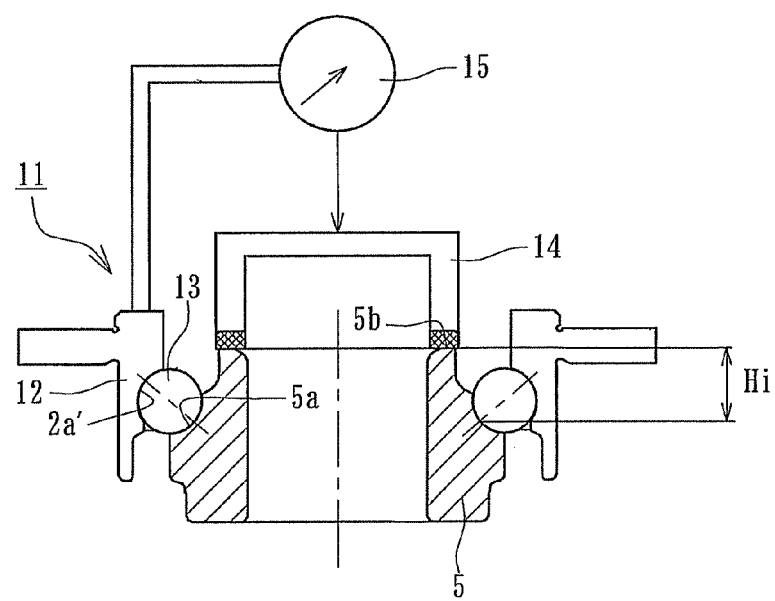

[Fig 3]
(a)
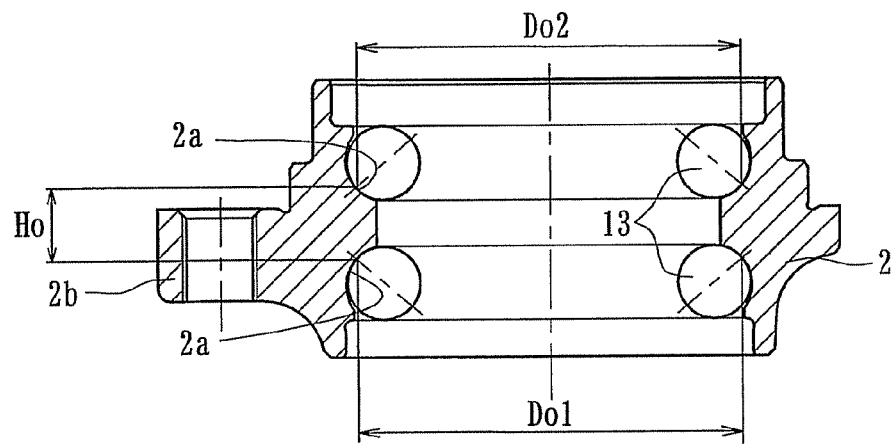
(b)
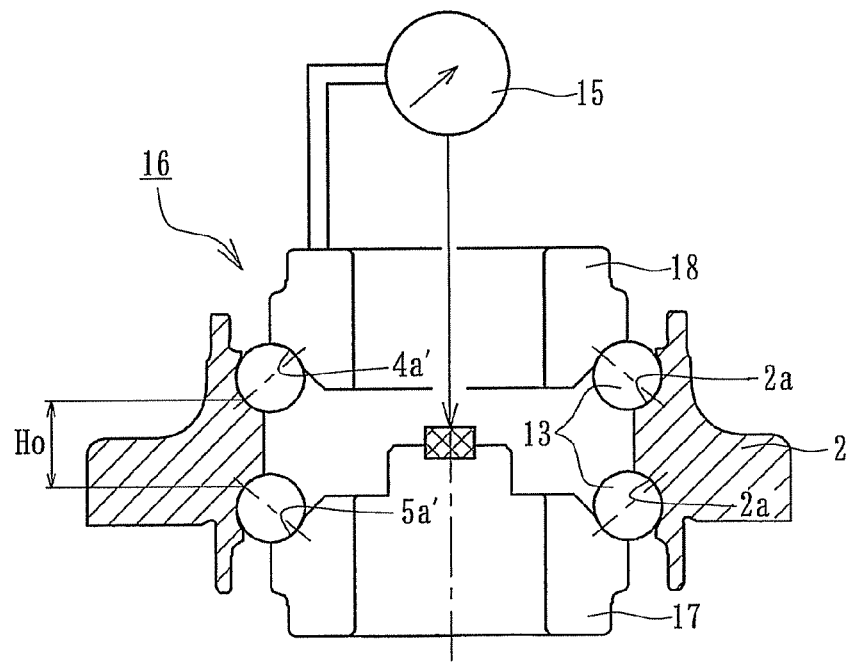

[Fig 4]
(a)
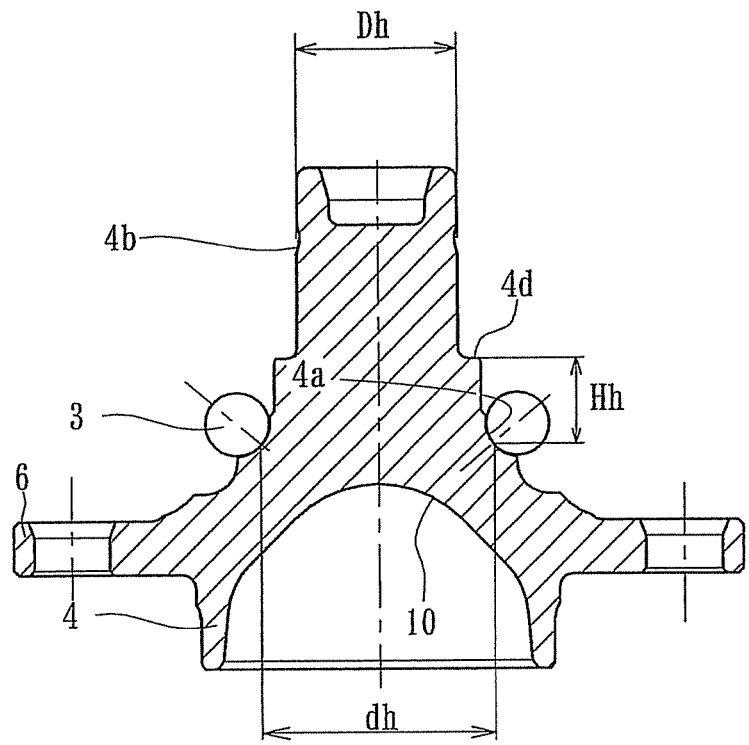
(b)
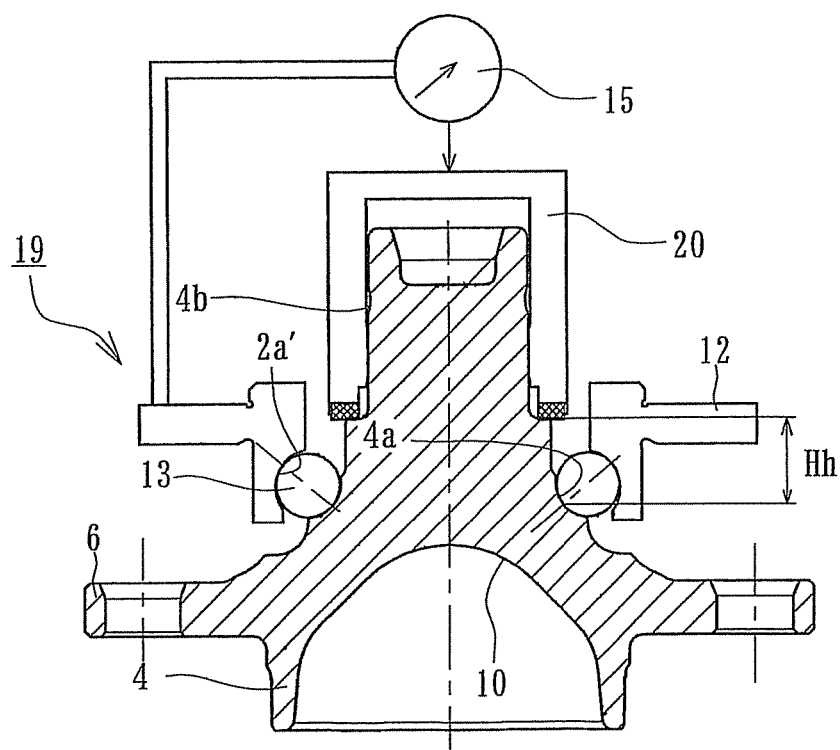

[Fig 5]
(a)
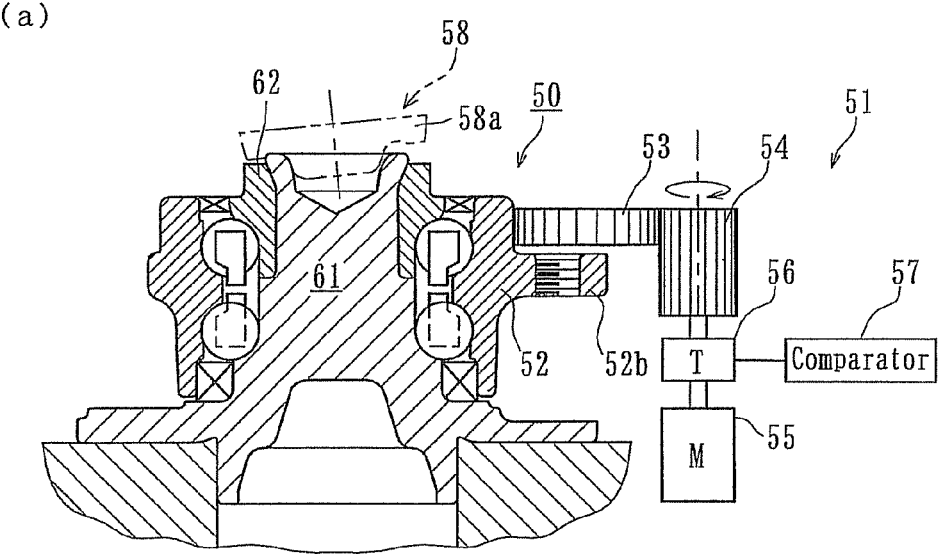
(b)
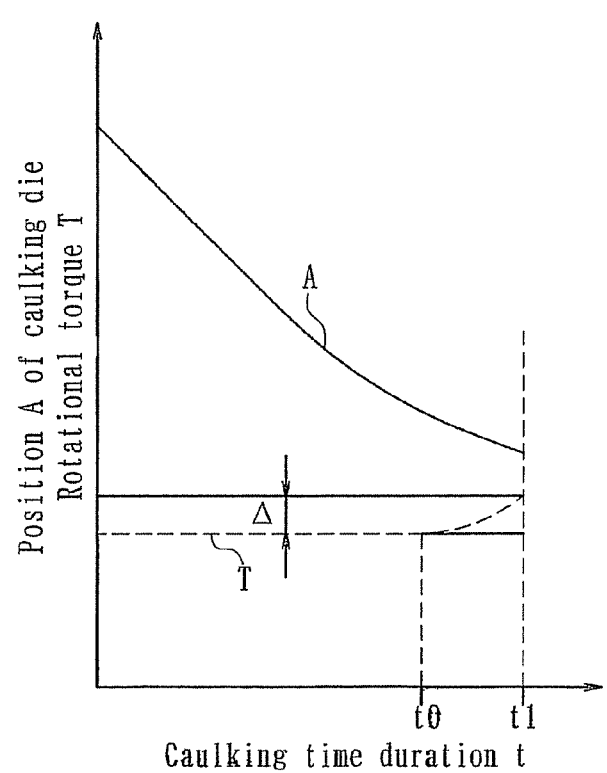

ns a continuation of International Application No. PCT/JP2012/065087, filed Jun. 13, 2012, which claims priority to Japanese Application No. 2011-132086, filed Jun. 14, 2011. The disclosures of the above applications are incorporating herein by reference.

METHOD FOR MANUFACTURING A WHEEL BEARING APPARATUS

CROSS-REFERENCE TO RELATED APPLICATIONS

This application is a continuation of International Application No. PCT/JP2012/065087, filed Jun. 13, 2012, which claims priority to Japanese Application No. 2011-132086, filed Jun. 14, 2011. The disclosures of the above applications are incorporating herein by reference.

FIELD

The present disclosure generally relates to a method for manufacturing a wheel bearing apparatus that rotatably supports a vehicle wheel, such as an automobile and, more particularly, to a method for manufacturing a wheel bearing apparatus that can easily and efficiently perform clearance control of a bearing and apply a stable and accurate clearance to the bearing.

BACKGROUND

A predetermined bearing pre-pressure is applied to the wheel bearing apparatus in order to assure a desirable bearing rigidity. In the wheel bearing apparatus of a so-called third generation type, that includes a wheel hub directly formed with an inner raceway surface on its outer circumference and an inner ring press-fit onto the wheel hub, the control of the amount of bearing pre-pressure has been performed by accurately controlling the abutting surfaces between the wheel hub and the inner ring and by setting the fastening torque (axial force) of a securing nut, when fastening together the wheel hub and a constant velocity universal joint.

The amount of bearing pre-pressure not only influences the bearing life and bearing rigidity, but also has a strong relationship to the running of a vehicle and improved fuel consumption. Thus, the amount of bearing pre-pressure is proportional to the rotational torque. Accordingly, a reduction in the amount of bearing pre-pressure can reduce the rotational torque. Thus, this contributes to improved fuel consumption. On the contrary, the bearing inclination angle is a main cause of the bearing rigidity which is inversely proportional to the bearing pre-pressure. Thus, an increase in the amount of pre-pressure can improve the bearing rigidity. This reduces the bearing inclination angle as well as suppresses the inclination of a brake rotor during running on a curved road. Accordingly, it is possible to provide a wheel bearing apparatus, that is excellent not only in the bearing life but also in fuel consumption, by setting an optimum pre-pressure of the bearing.

A method is known, as shown in FIG. 5(a), for controlling the pre-pressure (negative clearance) of bearings. This pre-pressure monitoring apparatus 51 is adapted to perform the pre-pressure setting by measuring a torque while rotating a bearing when the wheel bearing apparatus is assembled. The pre-pressure monitoring apparatus 51 includes a gear 53, with a rubber roller, adapted to contact with an outer circumference of the outer member 52 at the inner-side of its body mounting flange 52b. A driving gear 54 meshes with the gear 53. An electric motor 55 rotates the driving gear 54. A torque detector 56, including a power meter, detects the driving torque of the motor 55. A comparator 57 compares the detected rotational torque with a predetermined value.

In the pre-pressure monitoring apparatus 51, the motor 55 is driven to rotate the outer member 52 via the gears 54, 53. The rotational torque of the outer member 52 is detected by the torque detector 56. The amount of pre-pressure is measured based upon the detected rotational torque. When the measured amount of pre-pressure has reached a predetermined value, an amount of pre-pressure suitable for the wheel bearing apparatus 50, a swing motion type caulking apparatus 58 is retracted. Even after the caulking operation has been completed by the caulking apparatus 58, the rotational torque is monitored. The rotational torque is confirmed so that the amount of pre-pressure is proper.

FIG. 5(b) is a graph showing variations of the position A of a caulking die 58a of the swing motion type caulking apparatus 58. The rotational torque T (ordinate) is relative to a time duration "t" of caulking (abscissa). The caulking operation is started by gradually descending the position A of the caulking die 58a. Application of pre-pressure to the wheel bearing apparatus is begun at a point of time "t0". Variation of the rotational torque T is also begun at this time. When a magnitude of the variation has reached a predetermined value Δ at a point of time "t1", it is determined that an optimum pre-pressure has been applied to the wheel bearing apparatus 50. The caulking operation is then stopped. Then, the position A of the caulking die 58a is returned to the origin. The pre-pressure monitoring apparatus 51 can perform setting an amount of pre-pressure while measuring the rotational torque by rotating bearings on an assembly of the wheel bearing apparatus 50 (See, JP 11-44319 A).

As described above, the prior art technology is structured so that an amount of pre-pressure on the bearings can be accurately and stably controlled by detecting rotational torque of the bearings by the pre-pressure monitoring apparatus 51, measuring the amount of pre-pressure based on the detected rotational torque, and operating the swing motion type caulking apparatus 58. Operation of the caulking apparatus is by determining whether the measured amount of pre-pressure is optimum or not. In manufacturing the wheel bearing apparatus, with the self-retaining structure, it is possible to accurately and stably control the amount of pre-pressure of the bearings, via the rotational torque, if each dimension of the groove diameters of the outer member 52, the wheel hub 61 and the inner ring 62 press-fit on the wheel hub 61, is finished within a desirable range. Thus, it is difficult to accurately control the amount of pre-pressure if there are variations in the dimensions of the groove diameters. In addition, since the detection of rotational torque is performed during manufacture of the wheel bearing apparatus, by the swing motion type caulking apparatus 58, it is impossible to re-assemble the wheel bearing apparatus by replacing part of its structural elements.

SUMMARY

It is, therefore, an object of the disclosure to provide a method for manufacturing a wheel bearing apparatus that can easily and efficiently perform clearance control of the bearing and apply a stable and an accurate clearance.

For achieving the above mentioned object, a method for manufacturing a wheel bearing apparatus comprises an outer member integrally formed with a body mounting flange on its outer circumference. The flange is to be mounted on a vehicle body. The outer member inner circumference includes double row outer raceway surfaces. An inner member includes a wheel hub and an inner ring. The wheel hub is integrally formed, on its one end, with a wheel mounting flange. The wheel hub outer circumference has an inner raceway surface corresponding to one of the double row outer raceway surfaces. A cylindrical portion axially extends from the inner raceway surface through a shoulder. The inner ring is press-fit onto the cylindrical portion of the wheel hub, via a predetermined interference. Double row rolling elements are rollably contained, via cages, between the inner raceway surfaces of the inner member and the outer raceway surfaces of the outer member. The wheel bearing apparatus is manufactured through steps of measuring a distance (Ho), (Hi) and Hh). Ho is measured from a contacting point, between one outer raceway surface of the double row outer raceway surfaces of the outer member and one rolling element of the double row rolling elements, to a contacting point, between the other outer raceway surface of the double row outer raceway surfaces of the outer member and the other rolling element of the double row rolling elements. The distance Hi is measured from a contacting point, between the rolling element and the inner raceway surface of the inner ring, to a smaller end face of the inner ring. The distance Hh is measured from a contacting point, between the rolling element and the inner raceway surface of the wheel hub, to a shoulder of the wheel hub. A difference ΔH=(Hi+Hh−Ho) is compared with a reference value of a model article. Rolling elements are selected that each have an optimum diameter for correcting the difference ΔH between the measured values and the reference values.

In the third generation type wheel bearing apparatus, the wheel bearing apparatus is manufactured through steps of measuring a distance (Ho), (Hi) and (Hh). Ho is measured from a contacting point, between one outer raceway surface of the double row outer raceway surfaces of the outer member and one rolling element of the double row rolling elements, to a contacting point, between the other outer raceway surface of the double row outer raceway surfaces of the outer member and the other rolling element of the double row rolling elements. The distance Hi is measured from a contacting point, between the rolling element and the inner raceway surface of the inner ring, to a smaller end face of the inner ring. The distance Hh is measured from a contacting point, between the rolling element and the inner raceway surface of the wheel hub, to a shoulder of the wheel hub. A difference ΔH=(Hi+Hh−Ho) is compared with a reference value of a model article. Rolling elements are selected that each have an optimum diameter to correct the difference ΔH between the measured values and the reference values. Thus, it is possible to provide a method for manufacturing a wheel bearing apparatus that can easily and efficiently perform the clearance control of the bearing and apply a stable and an accurate clearance. In addition, since the bearing clearance can be set before assembly of the inner ring, outer member and wheel hub, it is possible to re-assemble the wheel bearing apparatus by replacing part of its structural elements. Thus, this reduces the manufacturing cost.

The difference ΔH is corrected by calculating the interference of the inner ring while measuring the inner diameter of the inner ring and the outer diameter of the cylindrical portion. Also, the calculated value is compared with the reference value of the model article. This makes it possible to change the set value of the bearing clearance in accordance with variation of the bearing clearance based on the bulge of the inner ring due to its press-fit.

A measuring jig for the outer member comprises a simulated inner ring and a simulated wheel hub, respectively, with inner raceway surfaces of the same configurations and dimensions as inner raceway surfaces of the inner ring and the wheel hub. Also, the rolling elements are simulated with the same dimensions as the rolling elements. The distance Ho is measured by contacting the double row outer raceway surfaces of the outer member with the inner raceway surfaces of the simulated inner ring and a simulated wheel hub, via the simulated rolling elements. This makes it possible to perform an accurate and stable measurement of dimensions for a long term.

The distance Ho is measured under a condition where the outer member is rotated. This makes it possible to correct micro inclination of the outer member and configuration errors of the outer raceway surfaces. Thus, this provides stable measurements.

A measuring jig for the inner ring comprises a simulated outer member with an outer raceway surfaces of the same configurations and dimensions as the double row outer raceway surfaces of the outer member and simulated rolling elements with the same dimensions as the rolling elements. The distance Hi is measured by contacting the inner raceway surface of the inner ring with the outer raceway surface of the simulated outer member via the simulated rolling elements. This makes it possible to perform an accurate and stable measurement of the dimensions for a long term.

The distance Hi is measured under a condition where the inner ring is rotated. This makes it possible to correct micro inclination of the inner ring and configuration errors of the outer raceway surfaces. Thus, this provides stable measurements.

A measuring jig for the wheel hub comprises a simulated outer member with an outer raceway surface of the same configurations and dimensions as the double row raceway surfaces of the outer member and simulated rolling elements with the same dimensions as the rolling elements. The distance Hh is measured by contacting the inner raceway surface of the wheel hub with the outer raceway surface of the simulated outer member, via the simulated rolling elements. This makes it possible to perform an accurate and stable measurement of the dimensions for a long term.

The distance Hh is measured under a condition where the wheel hub is rotated. This makes it possible to correct micro inclination of the wheel hub and configuration errors of the outer raceway surfaces. Thus, this provides stable measurements.

According to the method for manufacturing a wheel bearing apparatus, the wheel bearing apparatus comprises an outer member integrally formed, on its outer circumference, with a body mounting flange. The body mounting flange is mounted on a vehicle body. The outer member inner circumference includes double row outer raceway surfaces. An inner member includes a wheel hub and an inner ring. The wheel hub is integrally formed, on its one end, with a wheel mounting flange. The wheel hub outer circumference includes an inner raceway surface corresponding to one of the double row outer raceway surfaces. A cylindrical portion axially extends from the inner raceway surface through a shoulder. The inner ring is press-fit onto the cylindrical portion of the wheel hub, via a predetermined interference. Double row rolling elements are rollably contained, via cages, between the inner raceway surfaces of the inner member and the outer raceway surfaces of the outer member. The wheel bearing apparatus is manufactured comprising steps of measuring distances Ho, Hi and Hh. Ho is measured from a contacting point, between one outer raceway surface of the double row outer raceway surfaces of the outer member and one rolling element of the double row rolling elements, to a contacting point, between the other outer raceway surface of the double row outer raceway surfaces of the outer member and the other rolling element of the double row rolling elements. The distance Hi is measured from a contacting point, between the rolling element and the inner raceway surface of the inner ring to a smaller end face of the inner ring. The distance Hh is measured from a contacting point, between the rolling element and the inner raceway surface of the wheel hub, to a shoulder of the wheel hub. A difference ΔH=(Hi+Hh−Ho) is compared with a reference value of a model article. Rolling elements are selected each with an optimum diameter to correct the difference ΔH between the measured values and the reference values. Thus, it is possible to provide a method for manufacturing a wheel bearing apparatus that can easily and efficiently perform clearance control of the bearing and apply a stable and an accurate clearance. In addition, since the bearing clearance can be set before assembly of the inner ring, outer member and wheel hub, it is possible to re-assemble the wheel bearing apparatus by replacing part of the structural elements. Thus, this reduces its manufacturing cost.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal-section view of one embodiment of a wheel bearing apparatus.

FIG. 2(*a*) is an explanatory view showing measuring portions of the inner ring of FIG. 1.

FIG. 2(*b*) is an explanatory view of a measuring method of the inner ring.

FIG. 3(*a*) is an explanatory view showing measuring portions of the outer member of FIG. 1.

FIG. 3(*b*) is an explanatory view of a measuring method of the outer member.

FIG. 4(*a*) is an explanatory view showing measuring portions of the wheel hub of FIG. 1.

FIG. 4(*b*) is an explanatory view of a measuring method of the wheel hub.

FIG. 5(*a*) is a schematic view for explaining the measuring method of the prior art.

FIG. 5(*b*) is a graph of variations of the caulking position and the rotational torque of a swing motion type caulking apparatus relative to the caulking duration of time.

DETAILED DESCRIPTION

A wheel bearing apparatus comprises an outer member integrally formed, on its outer circumference, with a body mounting flange. The body mounting flange is to be mounted on a vehicle body. The outer member inner circumference includes double row outer raceway surfaces. An inner member includes a wheel hub and an inner ring. The wheel hub is integrally formed on its one end, with a wheel mounting flange. The wheel hub outer circumference includes an inner raceway surface corresponding to one of the double row outer raceway surfaces. A cylindrical portion axially extends from the inner raceway surface through a shoulder. The inner ring is press-fit onto the cylindrical portion of the wheel hub, via a predetermined interference. Double row rolling elements are rollably contained, via cages, between the inner raceway surfaces of the inner member and the outer raceway surfaces of the outer member. The wheel bearing apparatus is manufactured through steps of measuring a distance Ho, Hi and Hh. Ho is measured from a contacting point, between one outer raceway surface of the double row outer raceway surfaces of the outer member and one rolling element of the double row rolling elements, to a contacting point, between the other outer raceway surface of the double row outer raceway surfaces of the outer member and the other rolling element of the double row rolling elements. The distance Hi is measured from a contacting point, between the rolling element and the inner raceway surface of the inner ring, to a smaller end face of the inner ring. The distance Hh is measured from a contacting point, between the rolling element and the inner raceway surface of the wheel hub, to a shoulder of the wheel hub. A difference ΔH=(Hi+Hh−Ho) is compared with a reference value of a model article. Rolling elements are selected that each have an optimum diameter to correct the difference ΔH between the measured values and the reference values. The difference ΔH is corrected by calculating the interference of the inner ring, while measuring the inner diameter of the inner ring and the outer diameter of the cylindrical portion, and by comparing the calculated value with the reference value of the model article.

One embodiment of the present disclosure will be described with reference to the accompanied drawings.

FIG. 1 is a longitudinal-section view of one embodiment of a wheel bearing apparatus. FIG. 2(*a*) is an explanatory view showing measuring portions of the inner ring of FIG. 1. FIG. 2(*b*) is an explanatory view of a measuring method of the inner ring. FIG. 3(*a*) is an explanatory view showing measuring portions of the outer member of FIG. 1. FIG. 3(*b*) is an explanatory view of a measuring method of the outer member. FIG. 4(*a*) is an explanatory view showing measuring portions of the wheel hub of FIG. 1. FIG. 4(*b*) is an explanatory view of a measuring method of the wheel hub. In the description below, an outer-side of a bearing apparatus when it is mounted on a vehicle is referred to as the "outer-side" (a left side in FIG. 1). An inner-side of a bearing apparatus when it is mounted on a vehicle is referred to as the "inner side" (a right side in FIG. 1).

The wheel bearing apparatus of FIG. 1 is a so-called "third generation" type for a driven wheel. It includes an inner member 1, an outer member 2, and double row rolling elements (balls) 3, 3 contained between the inner and outer members 1 and 2. The inner member 1 includes the wheel hub 4 and an inner ring 5 press-fit onto the wheel hub 4.

The wheel hub 4 is integrally formed, on its outer-side end, with a wheel mount flange 6. The wheel mount flange 6 mounts a wheel (not shown). The wheel hub outer circumference includes one (i.e. outer-side) inner raceway surface 4*a*. A cylindrical portion 4*b* axially extends from the inner raceway surface 4*a*. Hub bolts 6*a* are secured on the wheel mounting flange 6 at circumferentially equidistant positions.

A cup-shaped recess 10 is formed on the outer-side end of the wheel hub 4. This recess 10 extends from the outer-side end face of the wheel hub 4 to near the bottom of the outer-side inner raceway surface 4*a*. Thus, a wall thickness of the outer-side portion of the wheel hub 4 is substantially uniform. This makes it possible to solve a contradictory problem between a reduction of weight and size of the wheel hub 4 and an increase of its rigidity.

The inner ring 5 is formed, on its outer circumference, with the other (inner-side) inner raceway surface 5*a*. The inner ring 5 is press-fit onto the cylindrical portion 4*b* of the wheel hub 4 to form a double row angular contact ball bearing of the back-to-back duplex type. The inner ring 5 is axially secured on the wheel hub 4 by a caulked portion 4c. The caulked portion 4c is formed by plastically deforming the end of the cylindrical portion 4b under a predetermined pre-stressed condition. The inner ring 5 and rolling elements 3 are formed of high carbon chrome steel such as SUJ2. They are dip hardened to their cores to have a hardness of 58~64 HRC.

The wheel hub 4 is made of medium-high carbon steel such as S53C including carbon of 0.40~0.80% by weight. It is hardened by high frequency induction hardening to have a surface hardness of 58~64 HRC over a region from an inner-side base 6c of the wheel mounting flange 6 to the cylindrical portion 4b, including the inner raceway surface 4a. The caulked portion 4c is not hardened and kept with a hardness as is after forging. This enables sufficient mechanical strength to be applied against the rotary bending load applied to the wheel mounting flange 6. This improves the fretting strength of the cylindrical portion 4b forming the fitting portion of the inner ring 5. Also, it smoothly performs a plastic deformation operation of the caulking portion 4c without causing any micro cracks.

Outer member 2 is integrally formed, on its outer circumference, with a body mount flange 2c. The body mount flange 2c is mounted on a knuckle (not shown). The outer member inner circumference includes double row outer-side outer raceway surfaces 2a, 2a. The outer raceway surfaces 2a, 2a oppose the inner raceway surface 4a of the wheel hub 4 and an inner raceway surface 5a of the inner ring 5. Double row rolling elements 3, 3 are contained between the outer and inner raceway surfaces. The double row rolling elements 3, 3 are rollably held by cages 7.

Outer member 2 is formed of medium-high carbon steel such as S53C including carbon of 0.40~0.80% by weight. It is formed, on its inner circumference, with double row outer raceway surfaces 2a, 2a that are hardened by high frequency induction hardening to have a surface hardness of 58~64 HRC. Seals 8, 9 are mounted in openings formed between the outer member 2 and the inner member 1 to prevent leakage of lubricating grease sealed within the bearing. The seals 8, 9 prevent entry of rain water or dust from the outside into the bearing.

Although it is shown with the double row angular contact ball bearing using balls, as the rolling elements 3, it may be a double row tapered roller bearing using tapered rollers as the rolling elements 3.

As shown in FIG. 2 (a), measuring portions of the inner ring 5 are a touch diameter. The touch diameter is a diameter between points where the rolling elements 3 contact with the inner raceway surface 5a of the inner ring 5 at a predetermined contacting angle "di". A touch portion pitch length is a distance from the touch point to the smaller end face 5b of the inner ring 5 "Hi". The inner ring 5 includes inner diameter "Di". By measuring these portions, it is possible to accurately control the dimensions of the inner ring 5 even though there would be variations in the configuration of the inner raceway surface 5a.

The measurement of the touch portion pitch length Hi of the inner ring 5 is performed by a measuring jig 11 shown in FIG. 2 (b). The measuring jig 11 includes a simulated outer member 12, simulated rolling elements 13 and a pressing jig 14. The touch portion pitch length Hi is measured by a distance measuring instrument 15, such as a dial gage, with the simulated outer member 12 fit onto the inner ring 5, via the simulated rolling elements 13. The simulated rolling elements 13 contact the outer raceway surface 2a of the simulated outer member 12 and the inner raceway surface 5a of the inner rings at predetermined measuring pressures. The inner ring is rotated. Thus, it is possible to correct micro inclination of the inner ring 5 and configuration errors of the inner raceway surface 5a and to have stable measurements.

As shown in FIG. 3(a), the measuring portions of the outer member 2 is touch diameters Do1, Do2 and a touch portion pitch length Ho. By measuring these portions, it is possible to accurately control dimensions of the outer member 2 even though there would be variations in the configuration of the double row outer raceway surfaces 2a, 2a.

The measurement of the touch portion pitch length Ho of the outer member 2 is performed with use of a measuring jig 16 shown in FIG. 3(b). The measuring jig 16 includes a simulated inner ring 17, simulated wheel hub 18 and simulated rolling elements 13. The touch portion pitch length Ho is measured by a distance measuring instrument 15, such as a dial gage. The simulated inner ring 17 and the simulated wheel hub 18 are fit into the outer member 2, via the simulated rolling elements 13. The simulated rolling elements 13 contact the inner raceway surfaces 5a, 4a of the simulated inner ring 17 and the simulated wheel hub 18 and the outer raceway surface 2a, 2a of the outer member 2 at predetermined measuring pressures. The outer member is rotated. Thus, it is possible to correct micro inclination of the outer member 2 and the configuration errors of the outer raceway surfaces 2a and to have stable measurements.

As shown in FIG. 4(a), the measuring portions of the wheel hub 4 are a touch diameters dh, a touch portion pitch length Hh and an outer diameter Dh of the cylindrical portion 4b. The interference δ between the cylindrical portion 4b and the press-fit inner ring 5 is calculated as δ=Dh−Di. By measuring these portions, it is possible to accurately control dimensions of the wheel hub 4 even though there would be variations in the configuration of the inner raceway surfaces 4a of the wheel hub 4.

The touch portion pitch length Hh, which is a distance from the touch point to a shoulder 4d of the wheel hub 4, of the wheel hub 4 is performed using a measuring jig 19 shown in FIG. 4(b). The measuring jig 19 includes a simulated outer member 12, simulated rolling elements 13 and a pressing jig 20. The touch portion pitch length Hh is measured by a distance measuring instrument 15, such as a dial gage. The simulated outer member 12 is fit onto the wheel hub 4, via the simulated rolling elements 13. The simulated rolling elements 13 contact the outer raceway surface 2a of the simulated outer member 12 and the inner raceway surface 4a of the wheel hub 4 at predetermined measuring pressures. The wheel hub is rotated. Thus, it is possible to correct micro inclination of the wheel hub 4 and the configuration errors of the inner raceway surfaces 4a and have stable measurements.

The measured information is inputted into a computer. More particularly, the information of the touch diameter di and the touch portion pitch length Hi of the inner ring 5, the information of the touch diameters Do1, Do2 and the touch portion pitch length Ho of the outer member 2, and the information of the touch diameter dh and touch portion pitch length Hh of the wheel hub 4 are inputted into the computer. Each value of them is operated in view of diameters of previously prepared rolling elements 3. An optimum diameter of a rolling element 3 is selected by this information. More particularly, rolling elements 3 of classifications including previously prepared several groups of diameters are selected based on information relating to the difference of each touch portion pitch length ΔH=(Hi+Hh−Ho) and the interference δ.

Thus, ΔH is adjusted so that rolling elements 3 each having a larger diameter are selected when the difference ΔH of each touch portion pitch length is large. On the contrary, rolling elements 3 each having a smaller diameter are selected when the difference ΔH of each touch portion pitch length is small, in accordance with variations in the bearing clearance based on bulge of the inner ring 5 due to press-fit. With adoption of such a method, it is possible to provide a method for manufacturing a wheel bearing apparatus that can easily and efficiently perform the clearance control of the bearing and apply a stable and an accurate clearance. In addition, since the bearing clearance can be set before assembly of the inner ring 5, outer member 2 and wheel hub 4, it is possible to re-assemble the wheel bearing apparatus by replacing part of its structural elements. Thus, this reduces its manufacturing cost.

The present disclosure can be applied to a third generation type wheel bearing apparatus irrespective of use for driving wheels or for driven wheels.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A method for manufacturing a wheel bearing apparatus comprising:

providing an outer member integrally formed, on its outer circumference, with a body mounting flange to be mounted on a vehicle body, the outer member inner circumference including double row outer raceway surfaces;

providing an inner member including a wheel hub and an inner ring, the wheel hub being integrally formed, on its one end, with a wheel mounting flange and the wheel hub outer circumference including an inner raceway surface corresponding to one of the double row outer raceway surfaces, a cylindrical portion axially extending from the inner raceway surface through a shoulder;

measuring a distance Ho, Hi and Hh;

Ho is measured on the outer member from a first touch diameter to a second touch diameter;

Hi is measured from a third touch diameter, of the inner ring to a smaller end face of the inner ring;

Hh is measured from a fourth touch diameter of the wheel hub to a shoulder of the wheel hub;

comparing a difference of ΔH=(Hi+Hh−Ho) with a reference value of a model article;

selecting rolling elements each having an optimum diameter to correct the difference ΔH between the measured values and the reference values;

inserting the rolling elements between the outer member and the inner member; and press fitting the inner ring onto the cylindrical portion of the wheel hub via a predetermined interference(δ).

2. The method for manufacturing a wheel bearing apparatus of claim 1, further comprising correcting the difference ΔH by calculating the interference (δ) of the inner ring while measuring the inner diameter (Di) of the inner ring and the outer diameter (Dh) of the cylindrical portion, and by comparing the calculated value with the reference value of the model article.

3. The method for manufacturing a wheel bearing apparatus of claim 1, wherein a measuring jig for the outer member comprises a simulated inner ring and a simulated wheel hub, respectively, having inner raceway surfaces of a same configurations and dimensions as inner raceway surfaces of the inner ring and the wheel hub and simulated rolling elements having same dimensions as the rolling elements, and wherein the first and second touch diameters are determined by contacting the double row outer raceway surfaces of the outer member with the inner raceway surfaces of the simulated inner ring and a simulated wheel hub via the simulated rolling elements.

4. The method for manufacturing a wheel bearing apparatus of claim 3, wherein the distance Ho is measured under a condition where the outer member is rotated.

5. The method for manufacturing a wheel bearing apparatus of claim 1, wherein a measuring jig for the inner ring comprises a simulated outer member having outer raceway surfaces with a same configurations and dimensions as the double row outer raceway surfaces of the outer member and simulated rolling elements having the same dimensions as the rolling elements, and wherein the third touch diameter is determined by contacting the inner raceway surface of the inner ring with the outer raceway surface of the simulated outer member via the simulated rolling elements.

6. The method for manufacturing a wheel bearing apparatus of claim 5, wherein the distance Hi is measured under a condition where the inner ring is rotated.

7. The method for manufacturing a wheel bearing apparatus of claim 1, wherein a measuring jig for the wheel hub comprises a simulated outer member having an outer raceway surface of same configurations and dimensions as the double row raceway surfaces of the outer member and simulated rolling elements having same dimensions as the rolling elements, and wherein the fourth touch diameter is determined by contacting the inner raceway surface of the wheel hub with the outer raceway surface of the simulated outer member via the simulated rolling elements.

8. The method for manufacturing a wheel bearing apparatus of claim 7, wherein the distance Hh is measured under a condition where the wheel hub is rotated.

* * * * *

UNITED STATES PATENT AND TRADEMARK OFFICE
CERTIFICATE OF CORRECTION

PATENT NO. : 9,512,883 B2
APPLICATION NO. : 14/105621
DATED : December 6, 2016
INVENTOR(S) : Yuuki Ogata et al.

It is certified that error appears in the above-identified patent and that said Letters Patent is hereby corrected as shown below:

Column 3
Line 26    "AH" should be --$\Delta$H--.

Column 7
Line 47    "FIG. 2 (a)" should be --FIG. 2(a)--.
Line 60    "FIG. 2 (b)" should be --FIG. 2(b)--.

Signed and Sealed this
Twenty-eighth Day of March, 2017

Michelle K. Lee
*Director of the United States Patent and Trademark Office*